May 4, 1926.
W. C. TAYLOR
ARTIFICIAL BAIT FOR FISH
Filed June 9, 1922
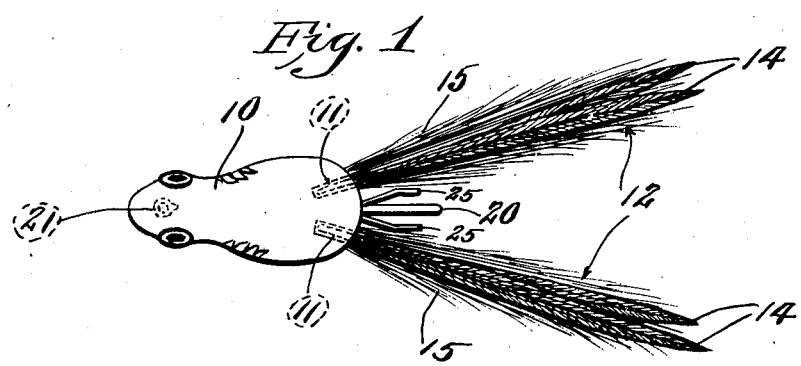
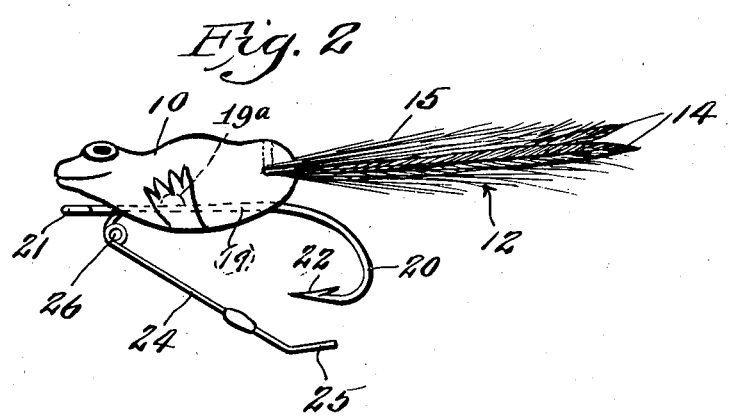
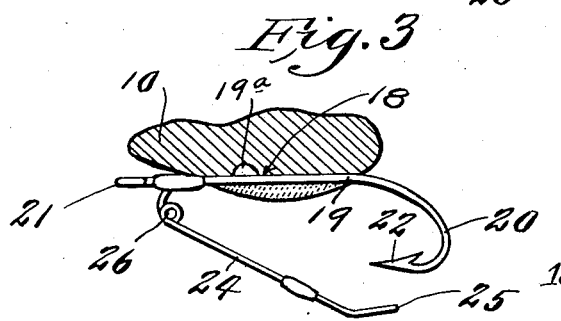
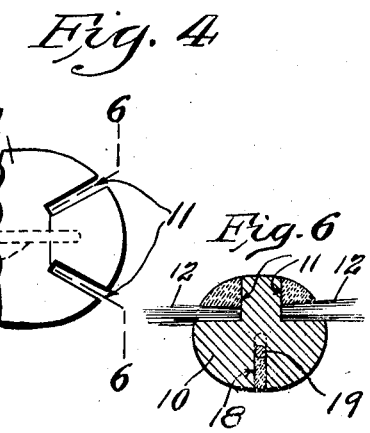
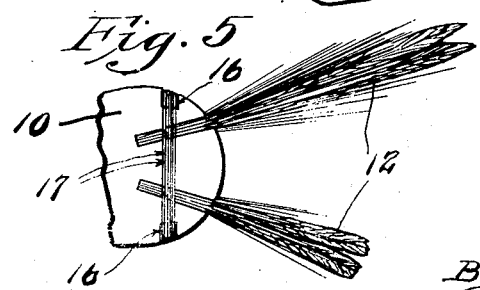
Inventor
Walter C. Taylor Patented May 4, 1926.

1,583,199

UNITED STATES PATENT OFFICE.

WALTER C. TAYLOR, OF ST. LOUIS, MISSOURI.

ARTIFICIAL BAIT FOR FISH.

Application filed June 9, 1922. Serial No. 566,924.

*To all whom it may concern:*

Be it known that I, WALTER C. TAYLOR, a citizen of the United States, residing at the city of St. Louis and State of Missouri, have invented a certain new and useful Improvement in Artificial Bait for Fish, of which the following is a full, clear, and exact description, such as will enable others skilled in the art to which it appertains to make and use the same, reference being had to the accompanying drawings, forming part of this application.

This invention relates generally to artificial fish baits, and more particularly to a fish bait designed to represent a frog, the latter being, as is well known, a favorite food of the fish and consequently a tempting bait.

The objects of my invention are to provide an artificial bait which as nearly as possible represents both in form and coloring a frog, and to mount the hook on said bait in such a manner that it will readily enter the lip of the fish when the latter strikes for the bait.

Further objects of my invention are to provide an artificial bait in the form of a frog and having rearwardly projecting flexible extensions which, when the bait is in the water, will wiggle and simulate the action of the legs of a swimming frog, thus proving an attractive and successful lure.

Still further objects of my invention are to provide a weed guard for the hook, the shank of which is formed with a number of turns or coils, thus forming a spring which yieldingly holds the guard in proper relation to the hook and permits said guard to readily yield when the fish strikes.

With these and other objects in view, my invention consists in certain novel features of construction and arrangements of parts hereinafter more fully described and claimed, and illustrated in the accompanying drawing, in which—

Figure 1 is a top plan view of the bait.

Figure 2 is a side elevation of the same.

Figure 3 is a longitudinal cross-section through the bait.

Figure 4 is a detail view of the rear end of the bait.

Figure 5 is a detail view of a modified form of the bait.

Figure 6 is a cross-sectional view on line 6—6 of Figure 4.

Referring by numerals to the accompanying drawings, 10 designates an artificial fish bait, preferably having the form of a frog and colored accordingly. The rear end of the bait has formed therein outwardly divergent slots or grooves 11 in which are adapted to be positioned the ends of flexible members or extensions 12. These are, in the present instance, in the form of feathers 14, but if desired, tufts of hair or other suitable material may be used separately or in conjunction with the feathers. When feathers 14 are used either separately or with tufts of hair 15, they are preferably seated in slots 11, the hair being arranged around the feathers 14 in order to protect and reinforce them. The feathers and hair are preferably held in position in slots 11 by any suitable waterproof cement, especially designed for use with cork of which the body is preferably made. If desired, however, notches 16, such as shown in Figure 5, may be formed in the body of the bait and thread or cord 17 wound therearound to clamp the body and more securely hold the feathers and hair in position in the slots 11. The underside of the body of the bait is formed with a longitudinally disposed groove 18 in which the shank 19 of hook 20 is seated and secured in position. The forward end of the shank 19 is provided with an eye 21 by means of which bait 10 can be attached to the leader and the hook is also provided with a unilateral projection 19$^a$ to prevent movement in its seat.

In order to prevent the barbed end 22 of hook 20 from becoming entangled in weeds or branches of trees or shrubs when casting or trolling, a guard 24 is provided and the forked end thereof normally occupies a position immediately in front of the barbed end 22. The guard is soldered or otherwise secured at its opposite end to shank 19 and is formed near its fixed end with a number of coils or turns to form a coiled spring 26. This spring holds the forked end 25 yieldingly in front of the barbed end 22 and when the fish strikes for the bait yields readily and moves inwardly toward the shank 19 so as not to interfere with hook 20. The body 10 is made of cork or analogous material so that it wil. float in the water and is painted as desired to waterproof the body and give it the appearance of the favorite bait.

When feathers are used for members 12, hackle feathers are preferred, as they possess a greater degree of flexibility. By securing the flexible members 12 at an angle to the axis of the bait, said members are caused to move or wiggle when the bait is in water due to the flowing water or to the motion of the bait therethrough.

What I claim is:

An artificial bait for fish comprising a body portion representing a frog, flexible members secured to said body portion and projecting rearwardly therefrom at an angle to the axis thereof and on a plane therewith, said members being adapted to simulate frog's hind legs in action, and a fish hook secured to said body portion and spaced below said flexible members.

In testimony whereof I hereunto affix my signature this 5th day of June, 1922.

WALTER C. TAYLOR.